US009401595B2

(12) United States Patent
Ge et al.

(10) Patent No.: US 9,401,595 B2
(45) Date of Patent: Jul. 26, 2016

(54) ELECTRICITY LEAKAGE WARNING

(71) Applicant: Jianyou Ge, Xiamen (CN)

(72) Inventors: Jianyou Ge, Xiamen (CN); Zhenqing Zhu, Xianyang (CN)

(73) Assignee: Jianyou Ge, Xiamen (CN)

( * ) Notice: Subject to any disclaimer, the term of this patent is extended or adjusted under 35 U.S.C. 154(b) by 0 days.

(21) Appl. No.: 14/649,905

(22) PCT Filed: Nov. 7, 2013

(86) PCT No.: PCT/CN2013/001345
§ 371 (c)(1),
(2) Date: Jun. 10, 2015

(87) PCT Pub. No.: WO2014/186926
PCT Pub. Date: Nov. 24, 2014

(65) Prior Publication Data
US 2016/0164275 A1 Jun. 9, 2016

(30) Foreign Application Priority Data

May 23, 2013 (CN) .......................... 2013 1 0192009
May 23, 2013 (CN) ....................... 2013 2 0282862 U

(51) Int. Cl.
*H02H 3/20* (2006.01)
*H02H 3/38* (2006.01)
*G08B 21/18* (2006.01)

(52) U.S. Cl.
CPC . *H02H 3/38* (2013.01); *G08B 21/18* (2013.01)

(58) Field of Classification Search
USPC ....................................................... 361/91.5
See application file for complete search history.

(56) References Cited

U.S. PATENT DOCUMENTS

| 3,824,441 | A | * | 7/1974 | Heyman | H02M 7/525 363/37 |
| 4,428,022 | A | * | 1/1984 | Engel | H02H 3/105 324/424 |
| 5,729,145 | A | * | 3/1998 | Blades | G01R 31/1272 324/522 |
| 5,940,256 | A | * | 8/1999 | MacKenzie | H02H 1/0015 361/42 |
| 5,986,860 | A | * | 11/1999 | Scott | G01R 31/025 361/115 |
| 6,272,025 | B1 | * | 8/2001 | Riggio | H01F 3/10 363/133 |
| 6,313,641 | B1 | * | 11/2001 | Brooks | G01R 31/025 324/424 |
| 2009/0040666 | A1 | * | 2/2009 | Elms | H02H 3/334 361/42 |
| 2009/0086387 | A1 | * | 4/2009 | Engel | H02H 1/0015 361/42 |
| 2010/0097733 | A1 | * | 4/2010 | E. | H02H 1/0015 361/42 |
| 2010/0157486 | A1 | * | 6/2010 | Parker | H02H 1/0015 361/2 |

* cited by examiner

*Primary Examiner* — Ronald W Leja
(74) *Attorney, Agent, or Firm* — Anna Tsang

(57) ABSTRACT

The invention discloses an electric leakage warning and protection circuit which includes a zero-sequence transformer, a overcurrent sensor and a zero line electricity leakage sensor are sequentially arranged and connected with a first control module, the first control module is further connected with a control end of a first silicon controlled rectifier, the first silicon controlled rectifier and a tripping coil are serially connected with each other and are jointly arranged between an anode and a cathode of the power module, an electric leakage display circuit is provided with a second silicon controlled rectifier and a first light emitting diode, the second silicon controlled rectifier is serially connected with the first light emitting diode, and a control end of the second silicon controlled rectifier is connected with the second control module. The electricity leakage warning and protection circuit has advantages of implementing electricity leakage warning and automatic tripping protection, so that the safety is greatly improved.

8 Claims, 1 Drawing Sheet

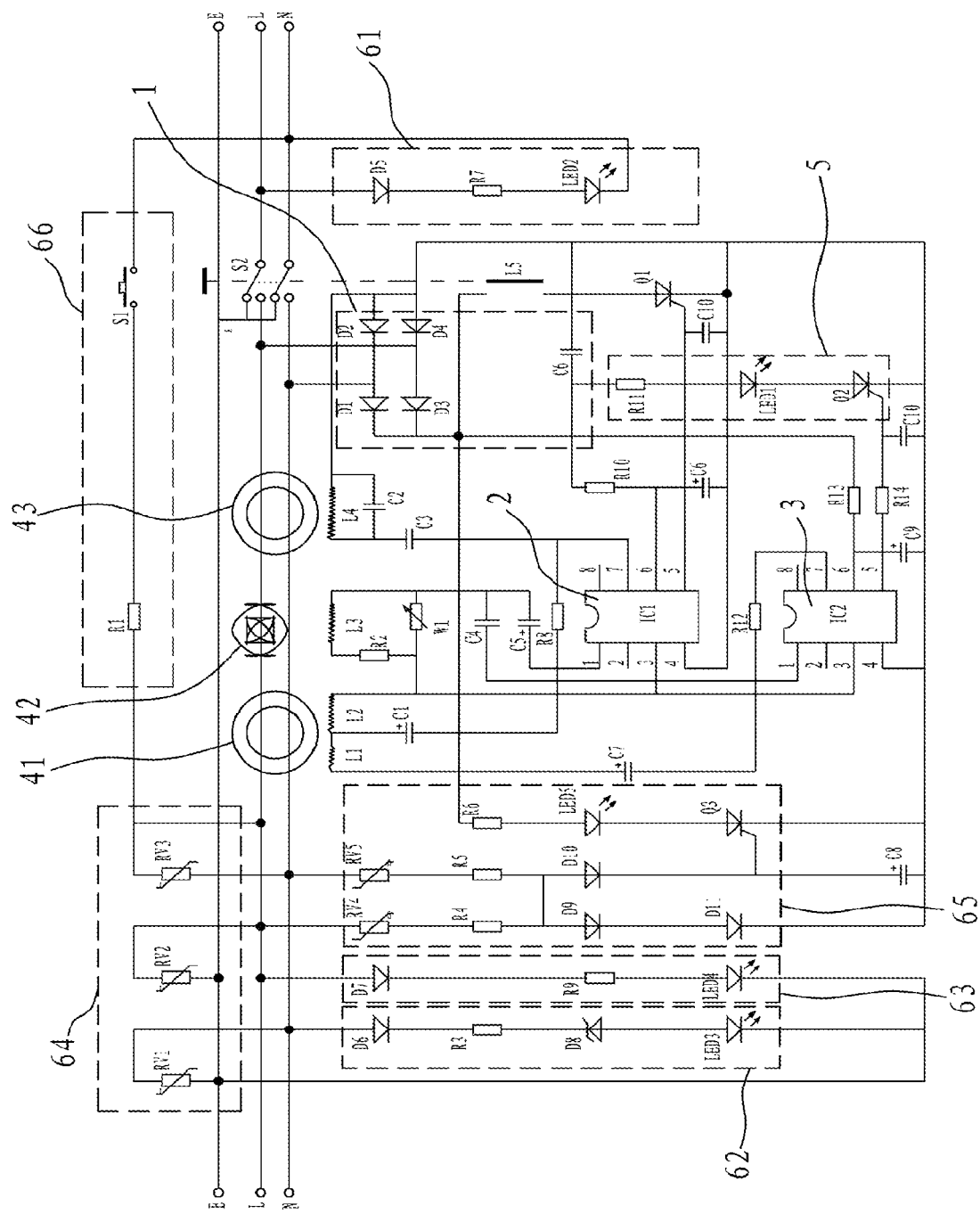

ELECTRICITY LEAKAGE WARNING

BACKGROUND OF THE INVENTION

1. Field of the Invention

The present disclosure relates to a field of low voltage electronic equipment, more specifically to an electricity leakage warning and protection circuit applied in a socket or a power strip.

2. Description of the Related Art

Currently, most sockets or power strips widely used by people are not provided with warning and protection devices. In daily life, the load electricity leakages caused due to failure usage may result in fire, even the persons may be damaged, so this defect is very dangerous for persons' property.

Therefore, what is need is an electricity leakage warning and protection circuit to solve the aforesaid defect of the existing socket or power strip.

SUMMARY OF THE INVENTION

An main objective of the present disclosure is to provide an electricity leakage warning and protection circuit to solve the problem that the electricity leakage in the load in the socket or the power strip cannot be reminded and protected in the traditional technology.

In order to achieve the aforesaid objective, a solution plan of the present disclosure is to provide an electricity leakage warning and protection circuit. The circuit comprises a power module, a first control module, a second control module, a zero-sequence transformer, an overcurrent sensor, a zero line electricity leakage sensor, a tripping coil, a first silicon controlled rectifier, a reset switch and an electric leakage display circuit. The power module is used to filter the inputted commercial electricity to dc power and provide load voltages to the first control module, the second control module and the electric leakage display circuit. The zero-sequence transformer is arranged between the live line and the null line. The overcurrent sensor is arranged on the live line and the zero line electricity leakage sensor is arranged between the live line and the null line. The zero-sequence transformer, the overcurrent sensor and the zero line electricity leakage sensor are sequentially arranged to enable resonance to be generated between the zero-sequence transformer and the zero line electricity leakage sensor. The zero-sequence transformer, the overcurrent sensor and the zero line electric leakage sensor are electrically connected with the first control module, the first control module is electrically connected with a control end of the first silicon controlled rectifier, and the first silicon controlled rectifier and a tripping coil are serially connected and jointly arranged between an anode and a cathode of the power module. The tripping coil controls turning on/off of the reset switch. The electric leakage display circuit includes a second silicon controlled rectifier and a first light emitting diode. The second silicon controlled rectifier and the first emit light are serially connected and jointly arranged between the anode and the cathode of the power module, and the control end of the second silicon controlled rectifier is electrically connected with the second control module.

Preferably, the power module includes a first diode, a second diode, a third diode, a fourth diode and a filter capacitor. A full bridge rectifier is formed by the first diode, the second diode, the third diode and the fourth diode, and the filter capacitor is connected between the anode and the cathode of the power module in parallel.

Preferably, the electricity leakage warning and protection circuit further includes a power indicator circuit which is arranged at back end of the reset switch and includes a fifth diode, a seventh resistor and a second light emitting diode connected serially. A positive electrode of the fifthly diode is connected with the live line, and a negative electrode of the second light emitting diode is connected with the null line.

Preferably, the electricity leakage warning and protection circuit further includes a null line risk voltage indicator circuit which is arranged at front end of the zero-sequence transformer and includes a sixth diode, a third resistor, a reference diode and a third light emitting diode connected serially. A positive electrode of the sixth diode is electrically connected with the null line, and a negative electrode of the third light emitting diode electrically connected with an earth wire.

Preferably, the electricity leakage warning and protection circuit further includes a safe ground indicator circuit which is arranged at front end of the zero-sequence transformer and includes a seventh diode, a ninth resistor and a fourth light emitting diode connected serially in order. A positive electrode of the seventh diode is electrically connected with the live line, and a negative electrode of the fourth light emitting diode is electrically connected with the earth wire.

Preferably, the electricity leakage warning and protection circuit further includes an overvoltage protection circuit which includes a first varistor, a second varistor and a third varistor respectively arranged between the live line and the null line, between the null line and the earth wire, and between the live line and the earth wire.

Preferably, the electricity leakage warning and protection circuit further includes a thunder display circuit which is located at the front end of the zero-sequence transformer and includes a fourth varistor, a fifth varistor, a fourth resistor, a fifth resistor, a ninth diode, a tenth diode, an eleventh diode, an eighth capacitor, a third silicon controlled rectifier, a fifth light emitting diode and a sixth resistor. Positive and negative electrodes of the sixth resistor, the fifth light emitting diode and the third silicon controlled rectifier are electrically connected serially between the anode and the cathode of the power module. The fourth varistor, the fourth resistor, the ninth diode and the eleventh diode are connected serially in order. The fifth varistor, the fifth resistor, the tenth diode and the eighth capacitor are connected serially in order. The eighth capacitor is further connected with a negative electrode of the eleventh diode, the fourth resistor is connected with the fifth resistor, a control end of the third silicon controlled rectifier is connected with a negative electrode of the tenth diode, the fourth varistor is connected with the live line, and the fifth varistor is connected with the null line.

Preferably, the electricity leakage warning and protection circuit further includes a test circuit which includes a first resistor and a test button connected serially. The first resistor is connected with the front end of the zero-sequence transformer, and the test button is connected with the back end of the reset switch, so as to enable the test circuit to cross the zero-sequence transformer, and the overcurrent sensor and the zero line electricity leakage sensor.

By such design, the electricity leakage warning and protection circuit of the present disclosure is provided with the zero-sequence transformer and the zero line electricity leakage sensor, so that when a leakage current at a certain degree (generally larger than 30 mA) is occurred, the first control module generates a control signal to the first silicon controlled rectifier, and the first silicon controlled rectifier then drives the tripping coil to turn off the reset switch, so as to generate the effect of tripping operation. Next, by using the second control module and the electric leakage display circuit, when the electricity leakage is occurred, the first light emitting diode can be driven to emit light by the second silicon controlled rectifier of the electric leakage display circuit, so as to provide an effect of warning the electricity leakage. If a failure of overcurrent or a large inrush current is occurred, the reset switch can be turned off by the first control module and the first silicon controlled rectifier.

In addition, the zero-sequence transformer and the zero line electricity leakage sensor of the present disclosure are close to each other to generate resonance, so that the signal of the zero line electricity leakage sensor can be transmitted to the zero-sequence transformer, and the first control module then triggers the first silicon controlled rectifier, whereby the reset switch is turned off by the tripping coil.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

FIG. 1 is a specific circuit diagram of a preferred embodiment of an electricity leakage warning and protection circuit of the present disclosure.

DETAILED DESCRIPTION OF THE PREFERRED EMBODIMENTS

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1. the present disclosure relates to an electric leakage warning and protection circuit which includes a power module 1, a first control module 2, a second control module 3, a zero-sequence transformer 41, an overcurrent sensor 42, a zero line electric leakage sensor 43, a tripping coil L5, a first silicon controlled rectifier Q1, a reset switch S2 and an electric leakage display circuit 5.

The power module 1 is used to rectificate and filter the inputted commercial electricity to dc power, and provide load voltages to the first control module 2, the second control module 3 and the electric leakage display circuit 5. Specifically, the power module 1 includes a first diode D1, a second diode D2, a third diode D3, a fourth diode D4 and a filter capacitor C6. A full bridge rectifier is formed by the first diode D1, the second diode D2, the third diode D3 and the fourth diode D4. The filter capacitor C6 is connected between the anode and the cathode of the power module 1 in parallel. Therefore, a DC voltage source can be formed by the power module 1

The zero-sequence transformer 41 is arranged between the live line L and the null line N, the overcurrent sensor 42 is arranged on the live line L, and the zero line is electricity the leakage sensor 43 is arranged between the live line L and the null line N. The zero-sequence transformer 41, the overcurrent sensor 42 and the zero line electricity leakage sensor 43 are sequentially arranged to enable resonance to be generated between the zero-sequence transformer 41 and the zero line electricity leakage sensor 43. The zero-sequence transformer 41, the overcurrent sensor 42 and the zero line electric leakage sensor 43 are electrically connected with the first control module 2, and the first control module 2 is further electrically connected with a control end of the first silicon controlled rectifier Q1. The first silicon controlled rectifier Q1 and the tripping coil L5 are serially connected and jointly arranged between the anode and the cathode of the power module 1. The tripping coil L5 is used to control turning on/off of the reset switch S2.

The electric leakage display circuit 5 includes a second silicon controlled rectifier Q2 and a first light emitting diode LED1. The second silicon controlled rectifier Q2 and the first light emitting diode LED1 are connected serially and jointly arranged between the anode and the cathode of the power module 1. A control end of the second silicon controlled rectifier Q2 and the second control module 3 are electrically connected with each other.

By such design, the electricity leakage warning and protection circuit of the present disclosure is provided with the zero-sequence transformer 41 and the zero line electricity leakage sensor 43, and when the leakage current at a certain degree (generally larger than 30 mA) is occurred, the first control module 2 generates a control signal to the first silicon controlled rectifier Q1, and the first silicon controlled rectifier Q1 then drives the tripping coil L5 to turn off the reset switch S2, so as to generate the effect of tripping operation. Next, by using the second control module 3 and the electric leakage display circuit 5, when the electricity leakage is occurred, the first light emitting diode LED1 can be driven to emit light by the second silicon controlled rectifier Q2 of the electric leakage display circuit 5, so as to provide an effect of warning the electricity leakage. If a failure of overcurrent or a large inrush current is occurred, the reset switch S2 can be turned off by the first control module 2 and the first silicon controlled rectifier Q1. In addition, the zero-sequence transformer 41 and the zero line electricity leakage sensor 43 of the present disclosure are close to each other to generate resonance, so that the signal of the zero line electricity leakage sensor 43 can be transmitted to the zero-sequence transformer 41, and the first control module 2 then triggers the first silicon controlled rectifier Q1, whereby the reset switch S2 can be turned off by the tripping coil L5.

As shown in FIG. 1, the electricity leakage warning and protection circuit further includes a power indicator circuit 61 which is arranged at a back end of the reset switch S2 and includes a fifth diode D5, a seventh resistor R7 and a second light emitting diode LED2 connected serially in order. A positive electrode of the fifthly diode D5 is electrically connected with the live line L, and a negative electrode of the second light emitting diode LED2 is electrically connected with the null line N. Therefore, when the reset switch S2 is in turning-off state, the second light emitting diode LED2 emits light to indicate that the power source is turned on.

As shown in FIG. 1, the electricity leakage warning and protection circuit further includes a null line risk voltage indicator circuit 62 which is arranged at front end of the zero-sequence transformer 41 and includes a sixth diode D6, a third resistor R3, a reference diode D8 and a third light emitting diode LED3 connected serially in order. A positive electrode of the sixth diode D6 is electrically connected with the null line N, and a negative electrode of the third light emitting diode LED3 is electrically connected with the earth wire E. Therefore, When a risk voltage is occurred on the null line N, the third light emitting diode LED3 can be turned on to emit light for indicating remind effect.

As shown in FIG. 1, the electricity leakage warning and protection circuit further includes a safe ground indicator circuit 63 which is arranged at the front end of the zero-sequence transformer 41 and includes a seventh diode D7, a ninth resistor R9 and a fourth light emitting diode LED4 connected serially in order. A positive electrode of the seventh diode D7 is electrically connected with the live line L, and a negative electrode of the fourth light emitting diode LED4 is electrically connected with the earth wire E. Therefore when the fourth light emitting diode LED4 emits light, it indicates that the ground state is nice.

In addition, the electricity leakage warning and protection circuit further includes an overvoltage protection circuit 64 which includes a first varistor RV1, a second varistor RV2 and a third varistor RV3 respectively arranged between the live line 64 and the null line N, between the null line and the earth wire E, and between the live line L and the earth wire E. In addition, the electricity leakage warning and protection circuit further includes a thunder display circuit 65 which is located at the front end of the zero-sequence transformer 41 and includes a fourth varistor RV4, a fifth varistor RV5, a fourth resistor R4, a fifth resistor R5, a ninth diode D9, a tenth diode D10, an eleventh diode D11, an eighth capacitor C8, a third silicon controlled rectifier Q3, a fifth light emitting diode LED5 and a sixth resistor R6. Positive and negative electrodes of the sixth resistor R6, the fifth light emitting diode LED5 and the third silicon controlled rectifier Q3 are connected serially between the anode and the cathode of the power module 1. The fourth varistor RV4, the fourth resistor R4, the ninth diode D9 and the eleventh diode D11 are connected serially in order. The fifth varistor RV5, the fifth resistor R5, the tenth diode D10 and the eighth capacitor C8 are connected serially in order. The eighth capacitor C8 is further electrically connected with a negative electrode of the eleventh diode D11, the fourth resistor R4 is electrically connected with the fifth resistor R5, a control end of the third silicon controlled rectifier Q3 is electrically connected with a negative electrode of the tenth diode D10, the fourth varistor RV4 is electrically connected with the live line L, and the fifth varistor RV5 is electrically connected with the null line N. Therefore, the control end of the third silicon controlled rectifier Q3 can be ensured to be within a normal range by the ninth diode D9, the tenth diode D10 and the eleventh diode D11, so the third silicon controlled rectifier Q3 can be normally operated and prevented from being burned.

In order to test whether the whole circuit can normally work, the electricity leakage warning and protection circuit further includes a test circuit 66 which includes a first resistor R1 and a test button S1 connected serially. The first resistor R1 is electrically connected with the front end of the zero-sequence transformer 41, the test button S1 is electrically connected with the back end of the reset switch S2 to enable the test circuit 66 to cross the zero-sequence transformer 41, the overcurrent sensor 42 and the zero line electricity leakage sensor 43. Therefore, when a person presses the test button S1, an electricity leakage at certain degree s generated in the whole circuit by the test circuit 66, at this time if the tripping coil L5 can turn off the reset switch S2, it means that the whole circuit is at a nice work state.

A first capacitor C1, a fifth capacitor C5, a fourth capacitor C4 and a third capacitor C3 are respectively arranged between the first control module 2 and the second control module 3, between the first control module 2 and the overcurrent sensor 42, between the second control module 3 and the overcurrent sensor 42, and between the first control module 2 and the zero line electricity leakage sensor 43. The second capacitor C2 is connected with the two ends of the sensing coil of the zero line electricity leakage sensor 43 in parallel. The zero-sequence transformer 41 includes zero-sequence transformer coils L1 and L2, the overcurrent sensor 42 includes an overcurrent sensing coil L3, and the zero line electricity leakage sensing 43 includes a null line electricity leakage sensing coil L4.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An electricity leakage warning and protection circuit, comprising: a power module, a first control module, a second control module, a zero-sequence transformer, an overcurrent sensor, a zero line electricity leakage sensor, a tripping coil, a first silicon controlled rectifier, a reset switch and an electric leakage display circuit, the power module used to rectificate and filter inputted commercial electricity to dc power and provide load voltages to the first control module, the second control module and the electric leakage display circuit;

the zero-sequence transformer arranged between a live line and a null line, the overcurrent sensor arranged on the live line, the zero line electricity leakage sensor arranged between the live line and the null line; the zero-sequence transformer, the overcurrent sensor and the zero line electricity leakage sensor sequentially arranged to enable resonance to be generated between the zero-sequence transformer and the zero line electricity leakage sensor;

the zero-sequence transformer, the overcurrent sensor and the zero line electric leakage sensor electrically connected with the first control module which is connected with a control end of the first silicon controlled rectifier, and the first silicon controlled rectifier and a tripping coil serially connected and jointly arranged between an anode and a cathode of the power module; and wherein the tripping coil controls turning on/off of the reset switch;

wherein the electric leakage display circuit comprises a second silicon controlled rectifier and a first light emitting diode, the second silicon controlled rectifier and the first emit light are serially connected and jointly arranged between the anode and the cathode of the power module, and the control end of the second silicon controlled rectifier is electrically connected with the second control module.

2. The electricity leakage warning and protection circuit as defined in claim 1, wherein the power module comprises a first diode, a second diode, a third diode, a fourth diode and a filter capacitor, and a full bridge rectifier is formed by the first diode, the second diode, the third diode and the fourth diode, and the filter capacitor is connected between the anode and the cathode of the power module in parallel.

3. The electricity leakage warning and protection circuit as defined in claim 1, further comprising a power indicator circuit which is arranged at back end of the reset switch and comprises a fifth diode, a seventh resistor and a second light emitting diode connected serially; and wherein a positive electrode of the fifthly diode is connected with the live line, and a negative electrode of the second light emitting diode is connected with the null line.

4. The electricity leakage warning and protection circuit as defined in claim 1, further comprising a null line risk voltage indicator circuit which is arranged at front end of the zero-sequence transformer and comprises a sixth diode, a third resistor, a reference diode and a third light emitting diode; and wherein a positive electrode of the sixth diode is electrically connected with the null line, and a negative electrode of the third light emitting diode is electrically connected with an earth wire.

5. The electricity leakage warning and protection circuit as defined in claim 1, further comprising a safe ground indicator circuit which is arranged at front end of the zero-sequence transformer and comprises a seventh diode, a ninth resistor and a fourth light emitting diode connected serially; and Wherein a positive electrode of the seventh diode is electrically connected with the live line, and a negative electrode of the fourth light emitting diode is electrically connected with an earth wire.

6. The electricity leakage warning and protection circuit as defined in claim 1, further comprising an overvoltage protection circuit which comprises a first varistor, a second varistor and a third varistor respectively arranged between the live line and the null line, between the null line and the earth wire, and between the live line and the earth wire.

7. The electricity leakage warning and protection circuit as defined in claim 1, further comprising a thunder display circuit which is located at the front end of the zero-sequence transformer and comprises a fourth varistor, a fifth varistor, a fourth resistor, a fifth resistor, a ninth diode, a tenth diode, an eleventh diode, an eighth capacitor, a third silicon controlled rectifier, a fifth light emitting diode and a sixth resistor; and wherein positive and negative electrodes of the sixth resistor, the fifth light emitting diode and the third silicon controlled rectifier are electrically connected serially between the anode and the cathode of the power module;

wherein the fourth varistor, the fourth resistor, the ninth diode and the eleventh diode are electrically connected serially in order, and the fifth varistor, the fifth resistor, the tenth diode and the eighth capacitor are connected serially in order, the eighth capacitor is further connected with a negative electrode of the eleventh diode, the fourth resistor is electrically connected with the fifth resistor, a control end of the third silicon controlled rectifier is electrically connected with a negative electrode of the tenth diode, the fourth varistor is electrically connected with the live line, and the fifth varistor connected with the null line.

8. The electricity leakage warning and protection circuit as defined in claim 1, further comprising a test circuit which comprises a first resistor and a test button connected serially; and wherein the first resistor is electrically connected with the front end of the zero-sequence transformer, the test button is electrically connected with the back end of the reset switch to enable the test circuit to cross the zero-sequence transformer, the overcurrent sensor and the zero line electricity leakage sensor.

\* \* \* \* \*